July 14, 1970  J. T. JABLONSKI, JR., ET AL  3,520,395
BOOK TRIMMING MACHINE
Filed Aug. 13, 1968  4 Sheets-Sheet 1

Inventors
Jerome T. Jablonski Jr.
James F. Cosgrove
By Kinzer, Dorn and Zickert
Attorneys Inventors
Jerome T. Jablonski Jr.
James F. Cosgrove By Kinzer, Dorn and Zickert
Attorneys Inventors
Jerome T. Jablonski, Jr.
James F. Cosgrove
By Kinzer, Dorn and Zickert
Attorneys

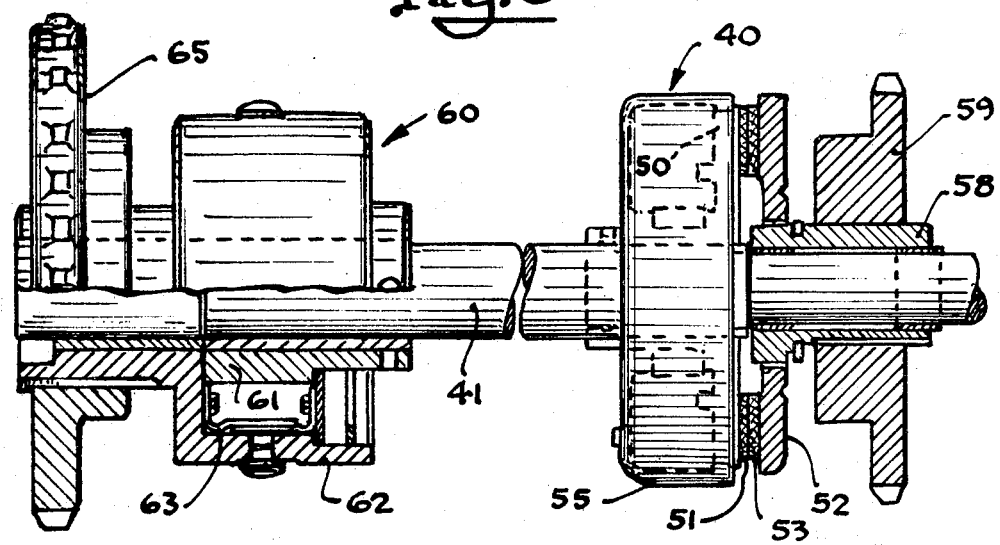
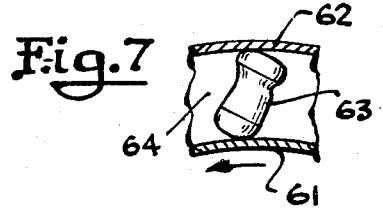
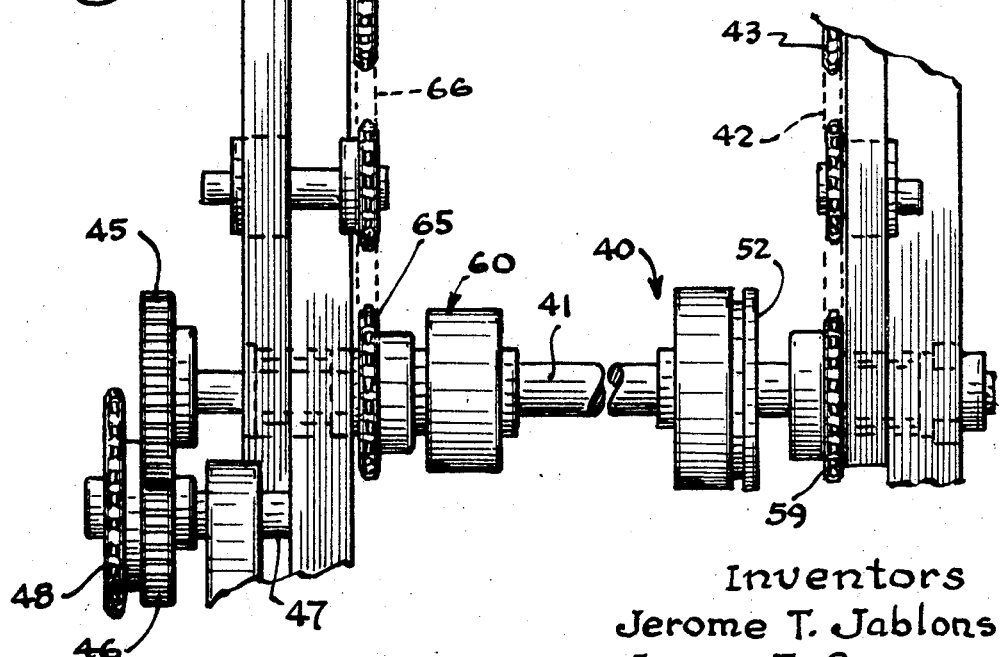

United States Patent Office 3,520,395
Patented July 14, 1970

3,520,395
BOOK TRIMMING MACHINE
Jerome T. Jablonski, Jr., Chicago, and James F. Cosgrove, Western Springs, Ill., assignors to Chicago Machinery Laboratory, Inc., Chicago, Ill., a corporation of Illinois
Filed Aug. 13, 1968, Ser. No. 752,259
Int. Cl. B65g 57/00; B67b 7/02
U.S. Cl. 198—35          6 Claims

ABSTRACT OF THE DISCLOSURE

Books are stacked for trimming by diverting one book from the main stream, delaying it, and redelivering it to the main stream to lie atop a companion book so that the two may be trimmed together. In order to assure that the stacked books will have edges in good alignment for trimming, a variable speed control is interposed by which the speed of the redelivered book may be regulated easily and at will.

---

This invention relates to a machine for trimming books composed of signatures.

Books are composed of signatures. Signatures are folded sheets. The signatures are collected in a gathering machine one atop another to compose the book. The gathered signatures are then stitched (as by staples) to complete the book. The completed book is usually trimmed by a knife. The present invention is concerned with means for advancing books to a trimming station.

A more compact and more efficient book trimmer can be afforded by collecting books one atop another at a collecting station prior to delivery of the books to the knife at the trimming station. Thus, it is customary to divert alternate books from the stream flowing to the trimmer on the conveyor and to redeliver the diverted book to the conveyor to lie atop its companion (a trailing book) so the two may be trimmed together rather than individually. This enables the knife to work more efficiently, since its rate (trim two books at once) need only be one-half the rate at which books are individually stitched; and moreover, the path of delivery to the knife is greatly shortened, since it is axiomatic that two books when stacked occupy less area than the two set side by side.

A problem may be presented, however, because of the frictional characteristics of the book covers. Thus, the trailing or undiverted book is being conveyed to the trimmer at a not inconsiderable speed, and when the diverted book is dropped onto the companion book it sometimes happens that their edges will not match, as they should at the time of trimming. What happens is that the dropped (redelivered) book may fail to slide on its companion due to high friction, or the companion book is moving forward toward the trimmer at a higher speed than the diverted book, however the phenomenon be viewed in terms of physics.

To correct for this phenomenon, the practice has been to stagger or vary the lugs on the conveyor which are responsible to push the books to the trimmer. Thus, by varying the lug spacing, compared to uniform spacing, it is possible to correct for the phenomenon explained above. But such correction is not easily accomplished; in fact, it is tedious and entails prolonged interruption of the machine while the task of resetting the pusher lugs is accomplished.

The primary object of the present invention is to impose a variable speed control on the diverted books. By doing this, the diverted book may be redelivered to the conveyor at a speed which will produce as near a perfect match as possible for good trimming. Thus, if the books have covers with high friction, the variable speed control will be set so that the diverted book will be dropped on the trailing companion book in perfect alignment; but if the covers are glossy and slip on one another, then the speed of redelivery will be increased so that the diverted book will be dropped on the companion book in misalignment with its back ahead of the back of the companion book, and resultant slippage only brings their edges into alignment for effective trimming. Specifically, the object of the present invention is to accomplish this by diverting a leading book around a delay wheel which delivers the diverted book to a position atop the companion book on the conveyor, the delivery wheel being driven through a clutch the effectiveness of which may be selectively varied easily and at will so that the speed of the delivery wheel may be accordingly varied; and in this connection another object of the invention is to initiate or start the delivery wheel instantly and without shock through another clutch.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention.

In the drawings:

FIG. 6 is a fragmentary sectional view of the clutches in the machine;

FIG. 7 is a schematic sectional view showing the principle of operation of the starting clutch;

FIG. 8 is a fragmentary plan view of a portion of the machine; and

Figure 1:
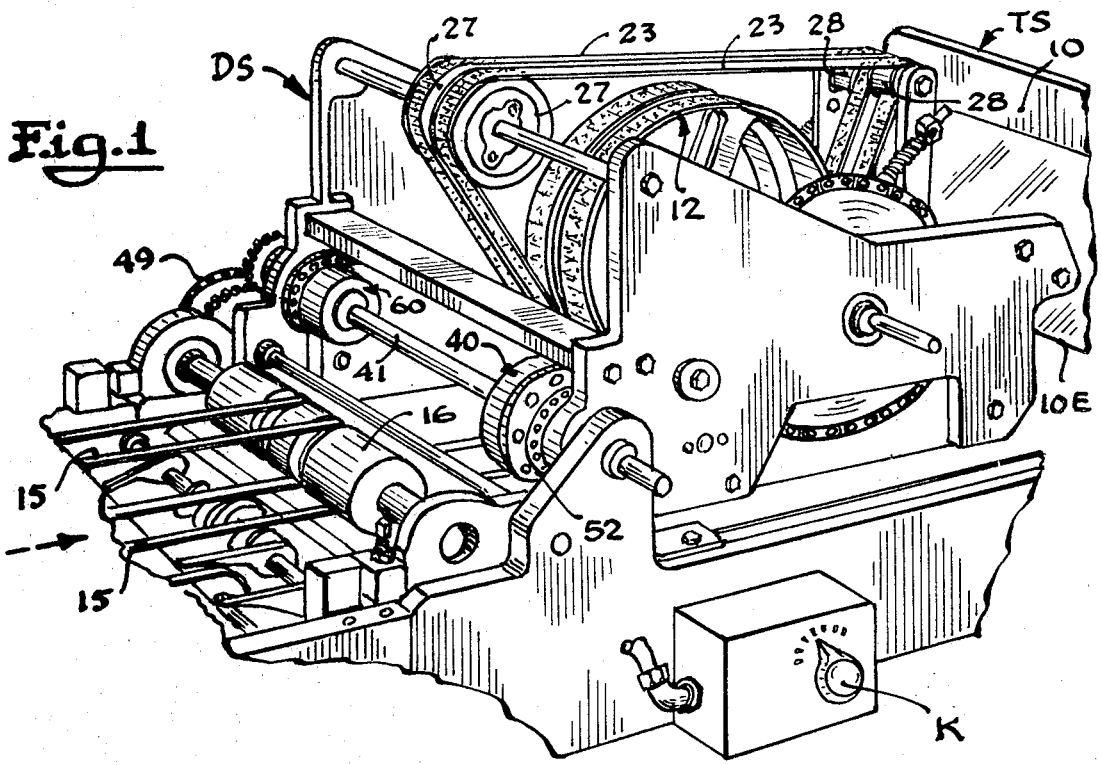
FIGS. 1 through 4 are detail perspective views of the machine of the present invention.
Figures 5, 5A:
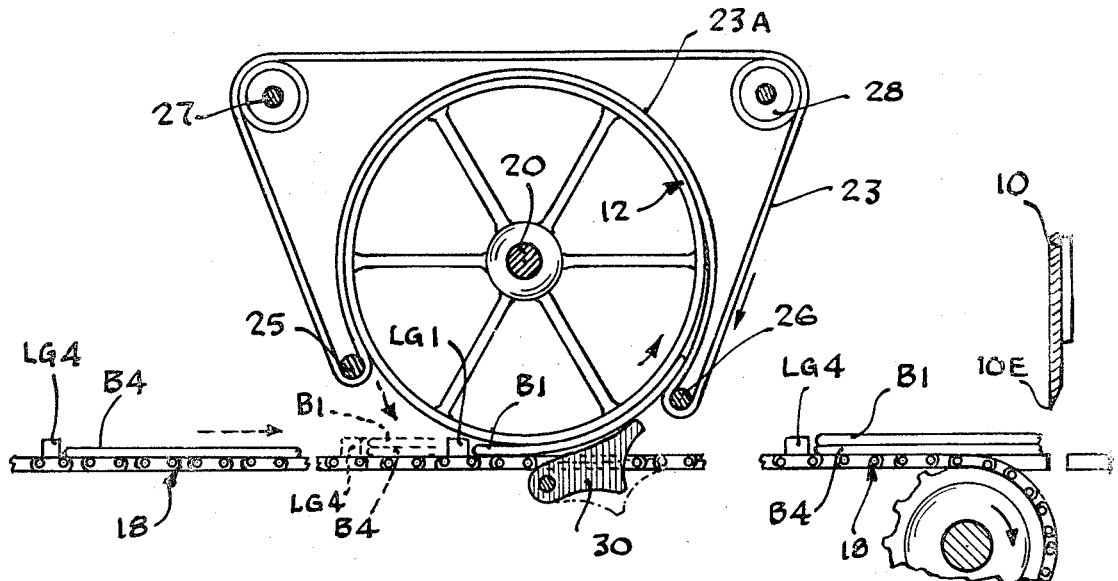
FIG. 5 is a fragmentary elevation of the machine showing the path of a diverted book.
FIG. 5A is a fragmentary view of the machine showing the cutter.

FIG. 1 portrays the two basic stations of the book trimming machine of the present invention: there is a trimming station TS characterized by a vertically reciprocal guillotine knife presenting a lower cutting edge 10E for trimming the trailing edges of two stacked books B1 and B4, FIG. 5A; and a delay station DS characterized by a revolving wheel 12 around which a diverted book as B1 is to travel in a centripetal path incidental to getting it juxtaposed on a companion (trailing) book as B4, because formerly the two books were in tandem, FIG. 5, before they were stacked, FIG. 5A.

The books to be trimmed approach the delay station from the left as viewed in FIG. 1. They are advanced, one leading another, by means including feed tapes 15, and are fed beneath squeeze rollers 16 which both press the books flat and further advance the books to a pair of endless conveyor chains 18, FIG. 2.

The conveyor chains 18 are constantly driven and each presents longitudinally spaced lugs LG. The lugs on the two chains are aligned opposite one another so that there will be a pair of laterally spaced lugs LG which engage the books to advance the books further toward the trimming station. The timing is such that a book is delivered by the rollers 16 to lie atop the chains 18, and then a pair of laterally spaced lugs LG engage the back of a book to start it toward the wheel 12.

Figure 9:
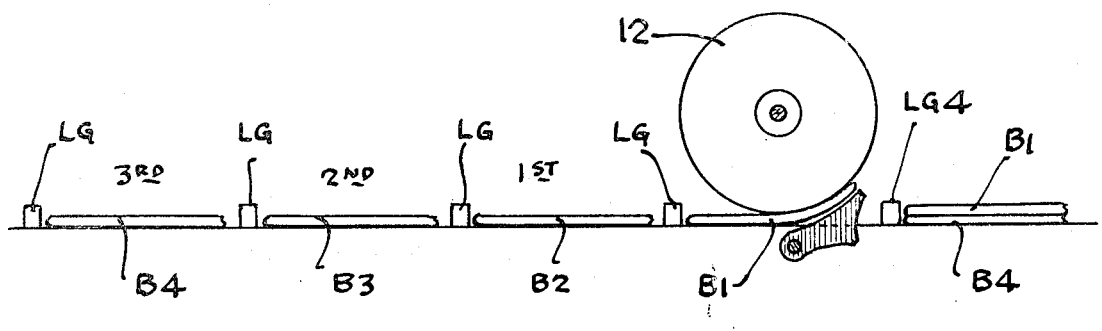
FIG. 9 is a schematic view showing the sequence of books.

FIGS. 5 and 5A, it may now be explained, attempt to show the time relationships involved. The chain 18 is continuous from FIG. 5 to FIG. 5A, but FIG. 5A is later in time compared to FIG. 5. Referring to FIG. 5, the leading book B1 is engaged by a lug LG1. Book B1 is to be diverted from the conveyor chains 18 and is to take a centripetal path around (with) the wheel 12 and is to be dropped atop and directly on a companion book. The speed relations are such that the companion book will be the fourth book back, B4, FIG. 9. Book B4, solid lines in FIG. 5, is being pushed forward by lugs as LG4 at the time book B1 (solid lines, FIG. 5) is being diverted to wheel 12. Thus, when lugs LG4 attain the dotted line position shown in FIG. 5, book B1 is being redelivered to the conveyor to lie atop book B4, and eventually lugs LG4 present the stack of books to the trimmer knife 10, FIG. 5A.

Figure 2:
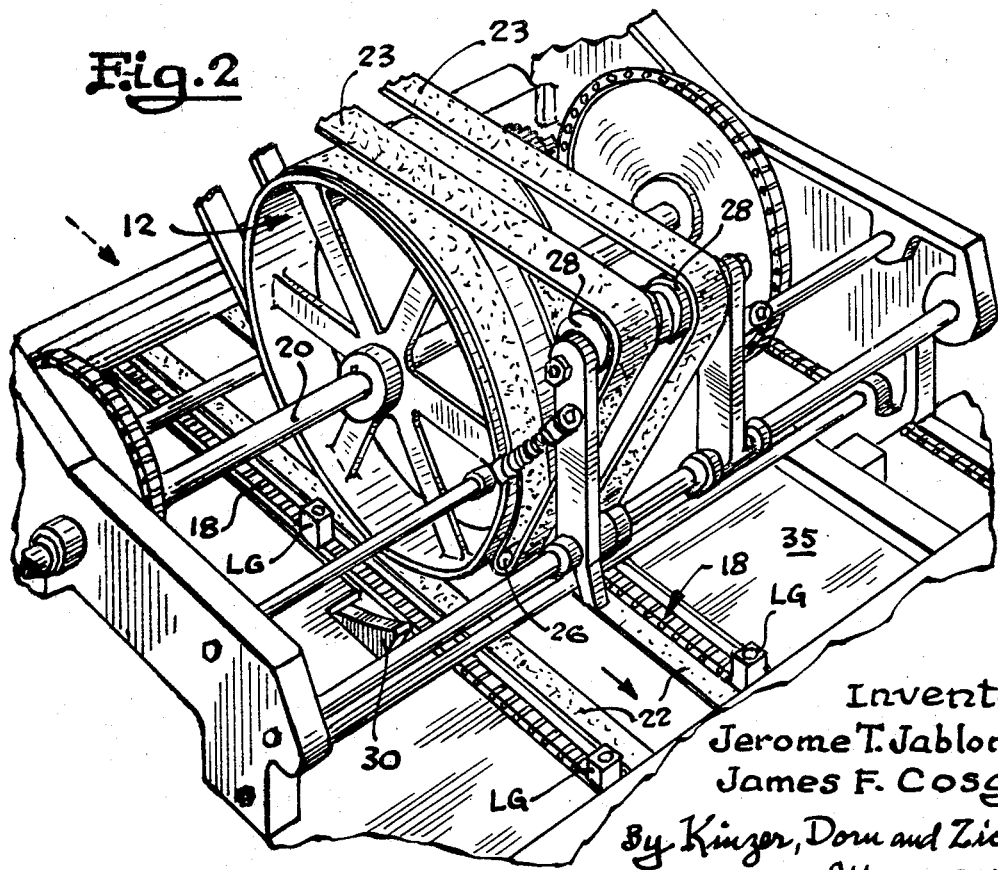

The diverting wheel 12, FIG. 2, is a time delay device. It is positioned above the conveyor means 18 and is secured to a driven shaft 20 to be rotated thereby, the axis of the shaft 20 being transverse to the path of the conveyor means 18. A pair of feed tapes or bands 22 assist the conveyor chains 18, being disposed parallel thereto and positioned at the inside of each chain 18 as will be evident in FIG. 2.

The two tapes 22 are beneath the wheel 12 and are related to a pair of upper guide tapes 23. As shown best in FIG. 5, each guide tape 23 is endless in form and presents an intermediate portion 23A which embraces and fits about approximately 270° of arc of the wheel 12, covering the entirety of the upper arc of the wheel 12. The configuration of each tape 23 is maintained by a pair of lower tensioning rollers 25 and 26 and pairs of upper idler pulleys 27 and 28. Thus, the arrangement of tensioning shafts and idler pulleys related to the belts 23 is such as to press each belt 23 in contact with a substantial portion of the periphery of the delay wheel 12.

Figure 3:
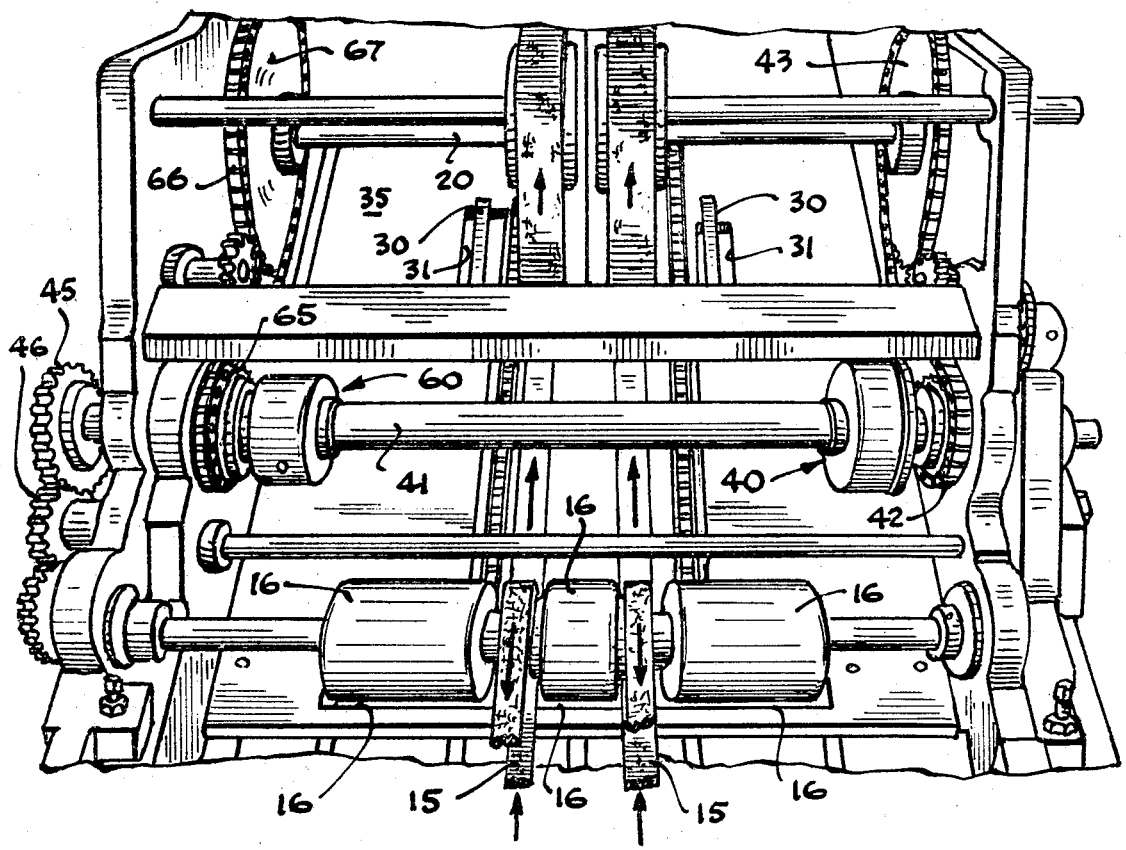
Figure 4:
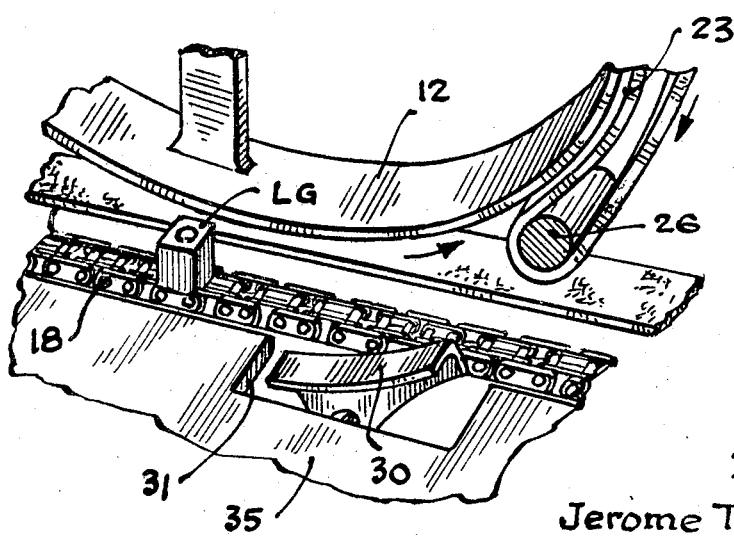

As shown in FIG. 3 there are a pair of deflectors 30 positioned within apertures 31 in the plate 35 which defines generally the path or stream of the books traveling in the direction of the trimmer knife. The deflectors 30 are normally depressed, but when actuated are elevated, FIG. 4, to direct a book into the bight between the outer periphery of the wheel 12 and the opposed surface of the belts as 23 whereby the diverted book is constrained to travel around with the wheel 12, being thus extracted or withdrawn from the mainstream of books traveling to the trimmer knife.

As will be apparent in FIG. 5, the centripetal path of the deflected book is a substantial one, conforming as it does to the wheel 12, and in any event, the path of diversion is such that when the diverted book is redelivered to the conveyor means 18, such is timed to occur substantially simultaneously with the arrival of the trailing companion book at the deflectors 30, the latter of course being ineffective on the companion book. The present invention is concerned with imposing a variable speed control on the shaft 20 which drives the wheel 12 so that the speed of the diverted book may be regulated to comply with the frictional characteristics of the covers of the books in light of the considerations set forth above. More specifically, if the books have non-slip covers (high friction) the speed of the wheel 12 will be such that the diverted book as B1 will be dropped atop the trailing companion book as B4 immediately in front of the lug which is pushing book B4 to the knife, and the backs of the books will be in perfect alignment at the time of the drop. However, if the covers of the books are slippery, then the speed of the wheel 12 will be increased so that the book to be redelivered will be dropped in front of the pusher lug, more or less, depending upon how much slip there is and how thick the book is.

The shaft 20 which carries the delay wheel 12 is driven through a variantly settable clutch 40, FIGS. 3 and 6. The input to the clutch 40 is a driven shaft 41, and rotary power from the clutch is transmitted to shaft 20 by means including a chain 42, FIGS. 3 and 8, which drives a large sprocket 43 fixed to wheel shaft 20. As will be described in more detail, the clutch 40 is variable over a wide range whereby the speed of the shaft 20 which carries the delay wheel 12 may be appropriately determined. The driven shaft 41 which is the input drive for the clutch 40 is provided with an extension on which is mounted a drive gear 45, FIG. 8. Gear 45 is meshed with a companion gear 46 on a stub shaft 47, and the stub shaft 47 carries a sprocket 48 driven by a chain 49, FIG. 1.

The clutch 40 is a magnetic clutch, and its output may be varied in terms of torque transmission rate (speed) by appropriately varying the magnetic field. To this end, clutch 40 includes a rotor 50 keyed to the shaft 41. The rotor 50 is provided with a clutch facing 51 of high friction material disposed opposite the driven plate 52 of the clutch having a friction facing 53 adapted to engage the friction face 51 of the driving rotor 50.

A magnetic field is established by a coil (not shown) inside a stationary housing 55, and the clutch plate 52 is an armature responsive to the magnetic field established by the coil such that when a field is created, the armature is attracted to the rotor 50 bringing the clutch facings 51 and 53 into frictional contact. Resultantly, torque from shaft 41 is transmitted to the armature hub 58 to which is fixed a sprocket 59 for driving chain 42.

The intensity of the magnetic field inside housing 55 determines the effectiveness with which the clutch facings 51 and 53 are coupled. In the instance of a weak field, very little torque (slow speed) is transmitted, whereas a field of maximum intensity produces a no-slip condition between the clutch facings 51 and 53 so that full speed of shaft 41 is transmitted to the driven sprocket 59, and resultantly the delay wheel 12 will be turned at its greatest speed.

Inasmuch as the operation of a magnetic clutch is well known, no further description is deemed necessary other than to point out that the intensity of the magnetic field is varied by the setting of a rheostat knob K, FIG. 1, which is simply a variable resistor, the setting of which allows for more or less current delivered to the coil of the clutch through appropriate electric wiring. Thus it will be seen that the manually settable knob K itself manifests the ability to vary the speed of the wheel 12 selectively and at will over a wide range.

While the machine is in operation, the clutch 40 is constantly engaged manifest in constant revolution of the delay wheel 12, but preferably a starting clutch 60 is utilized in order to eliminate shock and to establish immediate response of the wheel 12 to starting torques delivered to shaft 41 through chain 49. The clutch 60 is of the sprag type, establishing instant response as will be explained, and it is also over-running so that clutch 60 in effect is cut out once clutch 40 is up to speed.

Referring to FIG. 6, clutch 60 includes an inner rotor 61 keyed to shaft 41 so that rotor 61 rotates the instant that shaft 41 rotates. A stator sleeve 62 surrounds the rotor 61 in spaced concentric relation and so-called sprags 63 are located in the chamber 64, FIG. 7, established between the stator 62 and the rotor 61. The sprags couple the stator and the rotor for instantaneous response assuming that the rotor 61 is rotated in the direction indicated by arrow in FIG. 7. This is the circumstance prevailing at the instant of imparting rotation to the driven shaft 41.

The rotor 62 drives a sprocket 65, FIG. 6, and the sprocket 65 drives an endless chain 66 which in turn drives a sprocket 67 carried on the left-hand end of the drive shaft 20 for the delay wheel 12. Hence, the instant that rotary power is delivered to shaft 41, sprocket 67 is instantly driven to instantly drive the delay wheel 12. This is in contrast to a slight time delay for clutch 40 to become effective. The sprocket 43 driven by the chain 42, in turn driven through the clutch 40, has less teeth than sprocket 67. In the actual embodiment, the difference is that sprocket 67 has two more teeth than sprocket 43. Hence, when clutch 40 is up to speed, clutch 40 itself drives shaft 20. Sprocket 67 is in effect driven through clutch 40 and will turn faster than sprocket 43. The outer stator 62 of clutch 60 then partakes of relative motion compared to the rotor 61, being overdriven in effect and the sprags in effect are tilted to an ineffective position whereby clutch 60 is uncoupled or disengaged.

It will be seen from the foregoing that under the present invention precise control, producing accurate alignment of juxtaposed books to be delivered to a trimming knife, is achieved by a variable speed drive in the delay wheel 12. The wheel 12 may thus be controlled as to speed so that a diverted book may be returned to the conveyor at a speed commensurate with the tendency for relative slippage between the redelivered book and the companion book beneath it.

Hence, while we have illustrated and described the preferred embodiment of our invention, it is to be understood that this is capable of variation or modification within the purview of the following claims.

We claim:

1. In a book trimming machine having a trimming knife at a trimming station, a conveyor having feed means thereon engageable with books to move the books through a delay station prior to the books being delivered to the trimming station, means at the delay station operable on a leading book on the conveyor to deflect said leading book from the conveyor to and around a delay wheel which redelivers said leading book to drop atop a trailing book on the conveyor being advanced to the trimming station so that both books may be trimmed simultaneously, variable speed drive means for rotating said delay wheel, and manually settable means to selectively vary the speed of said drive means so that the redelivered book may be dropped on the trailing book with their backs in direct alignment in one run of the machine or dropped with its back ahead of the back of the trailing book in another run of the machine depending upon the slip characteristics of the covers of the books.

2. A machine according to calim 1 in which the variable speed drive means is a clutch.

3. A machine according to claim 2 which includes a starting clutch for driving the delay wheel, said starting clutch being overdriven and disabled by the first-named clutch when the first-named clutch is up to speed.

4. A machine according to claim 2 wherein the variable speed drive means is responsive to variation in an electric circuit and wherein said manually settable means varies said circuit.

5. A machine according to claim 4 wherein said drive means is a magnetic clutch and wherein said settable means varies the strength of the magnetic field applied to the clutch.

6. In a book trimming machine having a trimming knife at a trimming station, a conveyor having feed means thereon engageable with books to move the books through a delay station prior to the books being delivered to the trimming station, means at the delay station operable on a leading book on the conveyor to deflect said leading book from the conveyor, book delay means to subject the deflected book to a time delay and to redeliver to the conveyor the deflected book so that it drops atop a trailing book on the conveyor being advanced by a given feed means to the trimming station so that both books may be trimmed simultaneously, variable speed drive means for said book delay means, and manually settable means to selectively vary the speed of said drive means so that the speed of delivery of the redelivered book may be varied.

References Cited

UNITED STATES PATENTS 3,047,288  7/1962  Ramm _____ 198—33.4
2,859,859  11/1958  Winkel _____ 198—35

RICHARD E. AEGERTER, Primary Examiner

U.S. Cl. X.R.

81—29, 418; 270—58